US012657278B2

(12) United States Patent
Alridge

(10) Patent No.: US 12,657,278 B2
(45) Date of Patent: Jun. 16, 2026

(54) METHOD FOR MANAGING MOBILE APPS

(71) Applicant: Marion Alridge, Dickinson, TX (US)

(72) Inventor: Marion Alridge, Dickinson, TX (US)

( * ) Notice: Subject to any disclaimer, the term of this patent is extended or adjusted under 35 U.S.C. 154(b) by 69 days.

(21) Appl. No.: 18/408,048

(22) Filed: Jan. 9, 2024

(65) Prior Publication Data

US 2025/0225225 A1     Jul. 10, 2025

(51) Int. Cl.
*G06F 21/41* (2013.01)
*G06F 8/60* (2018.01)
*G06F 21/32* (2013.01)
*G06Q 30/0241* (2023.01)

(52) U.S. Cl.
CPC ............... *G06F 21/41* (2013.01); *G06F 8/60* (2013.01); *G06F 21/32* (2013.01); *G06Q 30/0241* (2013.01)

(58) Field of Classification Search
CPC   G06F 21/41; G06F 21/32; G06F 8/60; G06Q 30/0241
See application file for complete search history.

(56) References Cited

U.S. PATENT DOCUMENTS 8,413,210 B2     4/2013   Kuzin et al.
9,369,433 B1 *   6/2016   Paul ..................... H04L 63/029

9,473,485 B2     10/2016   Kendall
9,521,148 B2     12/2016   Weik, III et al.
9,521,551 B2     12/2016   Eisen et al.
2014/0067557 A1 *   3/2014   van Niekerk ...... G06Q 30/0277
705/26.61
2014/0074601 A1 *   3/2014   Delug .................... G06Q 30/02
705/14.64
2015/0358319 A1     12/2015   Taveau et al.
2016/0242024 A1 *   8/2016   Karren .................... G06F 21/88
2018/0213347 A1 *   7/2018   Kumar .................... H04W 4/50
2024/0161537 A1 *   5/2024   Gao .................... G06V 40/1318

* cited by examiner

*Primary Examiner* — Clayton R Williams
(74) *Attorney, Agent, or Firm* — Boudwin Intellectual Property Law, LLC; Daniel Boudwin

(57) ABSTRACT

A method for managing mobile apps that simultaneously display and log a user into their most preferred mobile apps and websites is needed. The overall system simultaneously logs a user into a plurality of secondary applications upon successful user authentication, such that security is maintained across the plurality of secondary applications. The overall system displays a selection of the most popular secondary applications as determined by data collected from users of the application, thereby allowing a user to select which of the plurality of secondary applications the user desires to simultaneously log into. After selection of the desired secondary applications, the user then inputs the individual login information for each of the secondary applications, such that the application may log the user into each secondary application after the user is authenticated. The overall system comprises an indicia representing a spiderweb and spider displayed on a screen of a computing device.

20 Claims, 9 Drawing Sheets

<u>104</u>

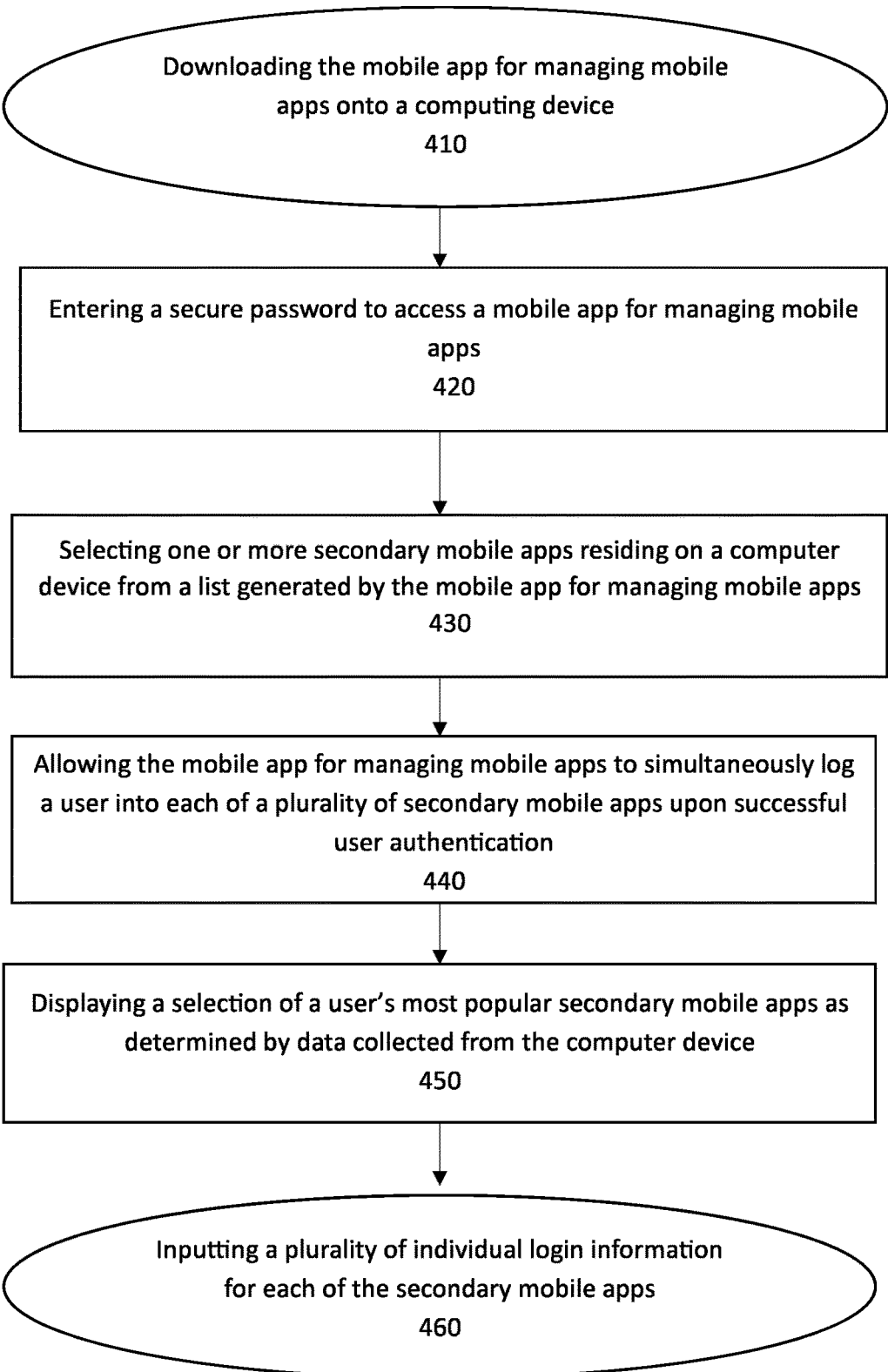

Downloading the mobile app for managing mobile
apps onto a computing device
410

Entering a secure password to access a mobile app for managing mobile
apps
420

Selecting one or more secondary mobile apps residing on a computer
device from a list generated by the mobile app for managing mobile apps
430

Allowing the mobile app for managing mobile apps to simultaneously log
a user into each of a plurality of secondary mobile apps upon successful
user authentication
440

Displaying a selection of a user's most popular secondary mobile apps as
determined by data collected from the computer device
450

Inputting a plurality of individual login information
for each of the secondary mobile apps
460

FIG. 8

METHOD FOR MANAGING MOBILE APPS

BACKGROUND OF THE INVENTION

The present invention relates to a method for managing software. More specifically, the invention relates to a method for managing mobile apps.

Many people use smartphones throughout their daily lives. In many instances, most individuals will have a number of favorite mobile apps or websites that they visit more frequently than others. Many people visit these mobile apps or websites as a part of a routine, going from one to the other. Unfortunately, it may be a hassle to close out of one of the mobile apps and then scroll over on to multiple screens to find another mobile app. Additionally, staying logged into mobile apps or websites may pose a security threat, but logging into mobile apps or websites before every use may be frustrating and time consuming.

Therefore, a method for managing mobile apps that simultaneously displays and logs a user into their most preferred mobile apps and websites is needed.

SUMMARY OF THE INVENTION

In view of the foregoing disadvantages inherent in the known types of methods for managing mobile apps now present in the prior art, the present invention provides a method for managing mobile apps, wherein the same may be utilized for ease of use between a user's favorite mobile apps and websites.

The present system includes a corresponding method for managing mobile apps and comprises the steps of downloading the mobile app for managing mobile apps, entering a secure password to access a mobile app for managing mobile apps, selecting one or more secondary mobile apps residing on a computer device from a list generated by the mobile app for managing mobile apps, allowing the mobile app for managing mobile apps to simultaneously log a user into each of the one or more secondary mobile apps upon successful user authentication, displaying a selection of a user's most popular secondary applications as determined by data collected from the computer device, and inputting a plurality of individual login information for each of the user's most popular secondary applications.

The present system also includes a corresponding non-transitory computer storage media having instructions stored thereon which, when executed, execute a method comprising the steps of downloading the mobile app for managing mobile apps, entering a secure password to access a mobile app for managing mobile apps, selecting one or more secondary mobile apps residing on a computer device from a list generated by the mobile app for managing mobile apps, allowing the mobile app for managing mobile apps to simultaneously log a user into each of a plurality of secondary mobile apps upon successful user authentication, displaying a selection of the user's most popular secondary applications as determined by data collected from the computer device, and inputting a plurality of individual login information for each of the secondary applications.

It is an object of the present invention to provide a method for managing mobile apps that manages and logs into up to eight user-selected applications or websites at the same time.

It is an object of the present invention to provide a method for managing mobile apps that allows people to access their most frequently used applications or sites from one central hub.

It is an object of the present invention to provide a method for managing mobile apps that updates applications and websites in real-time, while displaying live content.

It is an object of the present invention to provide a method for managing mobile apps that provides ease and convenience without sacrificing security and safety.

It is an object of the present invention to provide a method for managing mobile apps that helps save a smartphone's battery life, needing to only open one application instead of eight.

It is an object of the present invention to provide a method for managing mobile apps that alleviates the hassle of closing out an application and then scrolling across several screens to find another application.

It is an object of the present invention to provide a method for managing mobile apps that saves a considerable amount of time and frustration logging into each new app or site.

It is an object of the present invention to provide a method for managing mobile apps that includes a corresponding non-transitory storage media to perform the overall method.

It is an object of the present invention to provide a method for managing mobile apps that includes a single username/password sign-in with a respective person's 8 specifically chosen apps to save them time, give live results, and enhance their phone storage.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 8 shows a flowchart of an overall method for managing mobile apps.

DETAILED DESCRIPTION OF THE INVENTION

Figure 1:
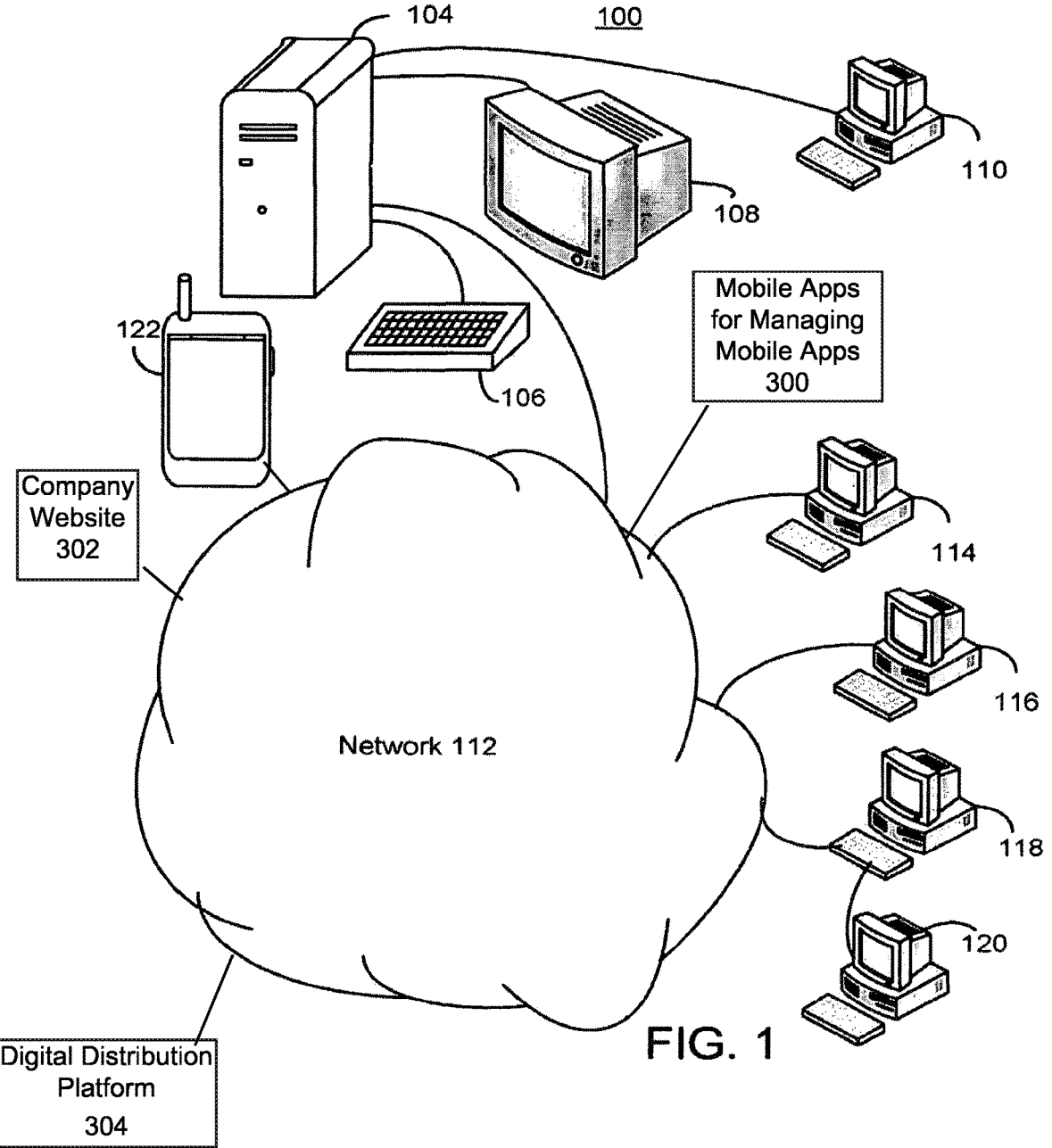
FIG. 1 shows a system overview of an embodiment of a system for managing mobile apps.

Reference is made herein to the attached drawings. Like reference numerals are used throughout the drawings to depict like or similar elements of a method for managing mobile apps 100. The figures are intended for representative purposes only and should not be considered to be limiting in any respect.

Referring now to FIG. 1 there is shown a system overview of a system for managing mobile apps 100.

The overall system 100 may include a server system 104, an input system 106, an output system 108, a plurality of client systems 110, 114, 116, 118 and 120, a communications network 112, a handheld wireless device 122, and a plurality of mobile apps for managing mobile apps 300. In other embodiments, the overall system 100 may include additional components and/or may not include all of the components listed above.

The server system 104 may include one or more servers. One server 104 may be the property of the distributor of any related software or non-transitory storage media. In other embodiments, the overall system 100 may include additional components and/or may not include all of the components listed above.

The input system 106 may be used for entering input into the server system 104, and may include any one of, some of, any combination of, or all of a keyboard system, a mouse system, a track ball system, a track pad system, a plurality of buttons on a handheld system, a scanner system, a wireless receiver, a microphone system, a connection to a sound system, and/or a connection and/or an interface system to a computer system, an intranet, and/or the Internet (i.e., IrDA, USB), for example.

The output system 108 may be used for receiving output from the server system 104, and may include any one of, some of, any combination of or all of a monitor system, a wireless transmitter, a handheld display system, a printer system, a speaker system, a connection or an interface system to a sound system, an interface system to one or more peripheral devices and/or a connection and/or an interface system to a computer system, an intranet, and/or the Internet, for example.

The overall system 100 illustrates some of the variations of the manners of connecting to the server system 104, which may be an information providing website (not shown). The server system 104 may be directly connected and/or wirelessly connected to the plurality of client systems 110, 114, 116, 118 and 120 and are connected via the communications network 112. Client system 120 may be connected to the server system 104 via the client system 118. The communications network 112 may be any one of, or any combination of, one or more local area networks or LANs, one or more local wide area networks or WANs, one or more local wireless networks, one or more local telephone networks, the Internet and/or other networks. The communications network 112 may include one or more wireless portals (not shown). The client systems 110, 114, 116, 118 and 120 may be any system that an end user may use to access the server system 104. For example, the client systems 110, 114, 116, 118 and 120 may be one or more local personal computers, one or more local workstations, one or more local laptop computers, one or more local game consoles, one or more local handheld network enabled audio/video players and/or one or more local of any other network appliance.

The client system 120 accesses the server system 104 via the combination of the communications network 112 and another system, which in this example is the client system 118. The client system 120 may be an example of a handheld wireless device 122, such as a mobile phone or a handheld network enabled audio/music player or the like, which may also be used for accessing network content.

The mobile apps for managing mobile apps 300 may be downloaded from a company website 302 or may be purchased through a digital distribution platform 304 such as a retail store services featuring computer software provided via the Internet and other computer and electronic communication networks or APP STORE®, a digital distribution platform for an operating system for mobile devices or ANDROID® or GOOGLE PLAY STORE® and the like.

Figure 2A:
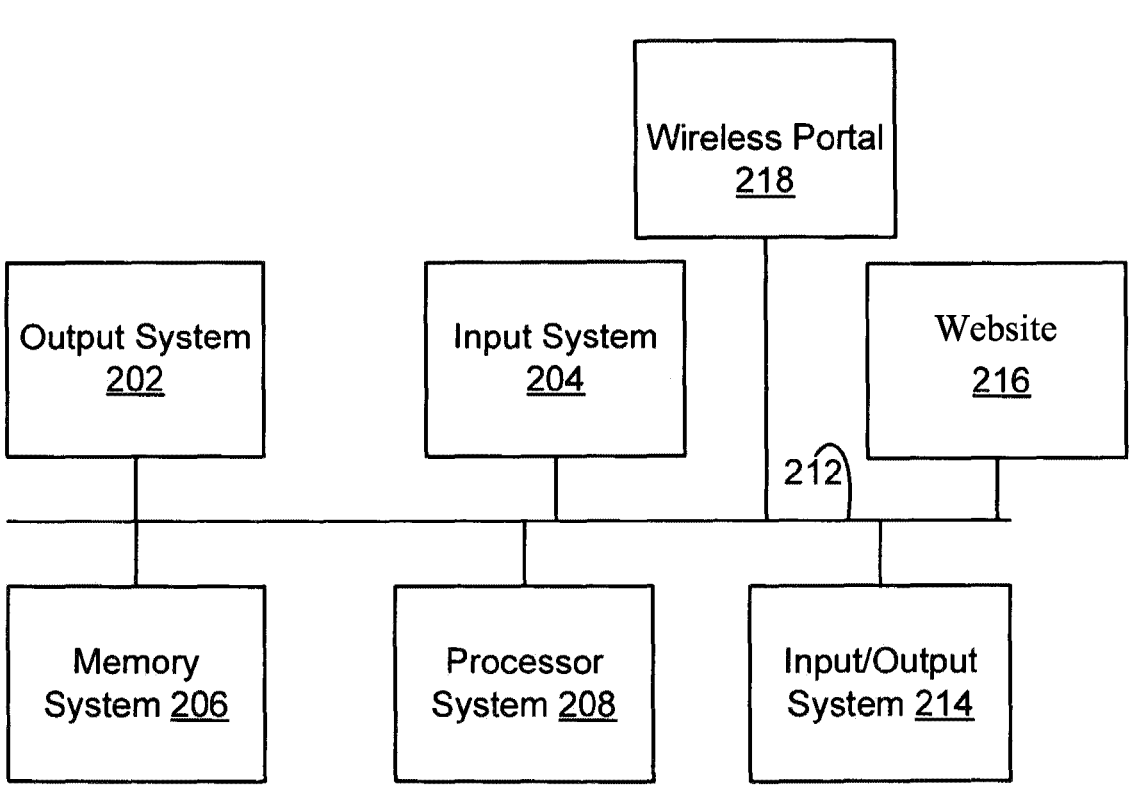
FIG. 2A shows a block diagram of an embodiment of a client system of the system for managing mobile apps.

Referring now to FIG. 2A there is shown a block diagram of a client system 200 of the system for managing mobile apps 100.

The client system 200 may include an output system 202, an input system 204, a memory system 206, a processor system 208, a communications system 212, an input/output system 214, a website 216, and a wireless portal 218. Other embodiments of the client system 200 may not have all of the components and/or may have other embodiments in addition to or instead of the components listed above.

The client system 200 may be any one of the client systems 110, 114, 116, 118, 120, and/or handheld wireless device 122 that may be used as one of the network devices of FIG. 1. In other embodiments, the client system 200 may include additional components and/or may not include all of the components listed above.

The output system 202 may include any one of, some of, any combination of or all of a monitor system, a wireless transmitter, a handheld display system, a printer system, a speaker system, a connection or an interface system to a sound system, an interface system to peripheral devices and/or a connection and/or an interface system to a computer system, an intranet, and/or the Internet, for example.

The input system 204 may include any one of, some of, any combination of, or all of a keyboard system, a mouse system, a track ball system, a track pad system, one or more buttons on a handheld system, a scanner system, a wireless receiver, a microphone system, a connection to a sound system, and/or a connection and/or an interface system to a computer system, an intranet, and/or the Internet (i.e., Infrared Data Association or IrDA, Universal Serial Bus or USB), for example.

Figure 2B:
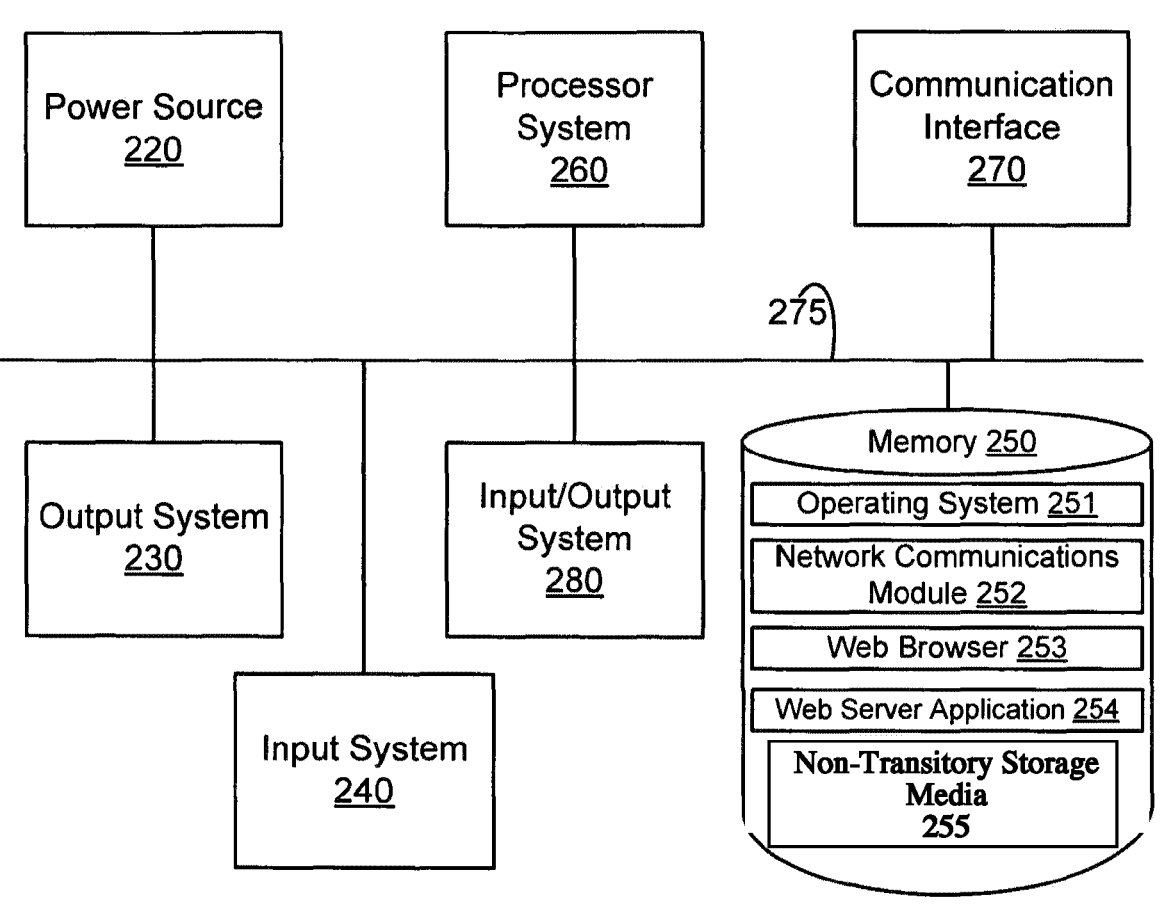
FIG. 2B shows a block diagram of an embodiment of a server system of the system for managing mobile apps.

The memory system 206 may include, for example, any one of, some of, any combination of or all of a long-term storage system, such as a hard drive, a short-term storage system, such as a random-access memory; a removable storage system, such as a floppy drive or a removable drive, and/or a flash memory. The memory system 206 may include one or more machine-readable mediums that may store a variety of different types of information. The term machine-readable medium is used to refer to any medium that is structurally configured for carrying information in a format that is readable by a machine. One example of a machine-readable medium is a computer-readable medium. The memory system 206 also stores a non-transitory storage media for managing mobile apps (FIG. 2B, 255).

The processor system 208 may include any one of, some of, any combination of, or all of multiple parallel processors, a single processor, a system of processors having one or more central processors and/or one or more specialized processors dedicated to specific tasks. The processor system 208 implements the programs stored in the memory system 206.

The communications system 212 communicatively buttons the output system 202, the input system 204, the memory system 206, the processor system 208, and/or the input/output system 214 to each other. The communications system 212 may include any one of, some of, any combination of, or all of one or more electrical cables, fiber optic cables, and/or means for sending signals through air or water (i.e., wireless communications), or the like. Some examples of means for sending signals through air and/or water include systems for transmitting electromagnetic waves such as infrared and/or radio waves and/or systems for sending sound waves.

The input/output system 214 may include devices that have the dual function as input and output devices. For example, the input/output system 214 may include one or more touch sensitive screens, which display an image and therefore are an output device and accept input when the screens are pressed by a finger or a stylus, for example. The touch sensitive screens may be sensitive to heat, capacitance and/or pressure. One or more of the input/output devices may be sensitive to a voltage or a current produced by a stylus, for example. The input/output system 214 is optional and may be used in addition to or in place of the output system 202 and/or the input device 204.

The client systems 110, 114, 116, 118, 120 and the handheld wireless device 122 may also be tied into a website 216 or a wireless portal 218 which is also tied directly into the communications system 212. Any website 216 or wireless portal 218 would also include software and a website module (no number) to maintain, allow access to and run the website as well.

FIG. 2B shows a block diagram of a server system 104 of the system for managing mobile apps 100.

The server system 104 may include a power source 220, an output system 230, an input system 240, a memory system 250, which may store an operating system 251, a communications module 252, a web browser module 253, a web server application 254, and a non-transitory storage media for managing mobile apps 255. The server system 104 may also include a processor system 260, a communications interface 270, a communications system 275, and an input/output system 280. In other embodiments, the server system 104 may include additional components and/or may not include all of the components listed above.

The power source 220 may include any one of, some of, any combination of, batteries and/or hardwire power sources such as electrical outlets and the like.

The output system 230 may include any one of, some of, any combination of, or all of a monitor system, a handheld display system, a printer system, a speaker system, a connection or interface system to a sound system, an interface system to one or more peripheral devices and/or a connection and/or interface system to a computer system, an intranet, and/or the Internet, for example.

The input system 240 may include any one of, some of, any combination of, or all of a keyboard system, a mouse system, a track ball system, a track pad system, one or more buttons on a handheld system, a scanner system, a microphone system, a connection to a sound system, and/or a connection and/or an interface system to a computer system, an intranet, and/or the Internet (i.e., IrDA, USB), for example.

The memory system 250 may include, for example, any one of, some of, any combination of, or all of a long-term storage system, such as a hard drive; a short-term storage system, such as random-access memory; or a removable storage system, such as a floppy drive or a removable drive and/or a flash memory. The memory system 250 may include one or more machine-readable mediums that may store a variety of different types of information. The term machine-readable medium is used to refer to any medium capable of carrying information that is readable by a machine. One example of a machine-readable medium is a computer-readable medium. The memory system 250 may store one or more machine instructions for a method for managing mobile apps 255. The operating system 251 controls all software or non-transitory storage media and hardware of the overall system 100. The communications module 252 may enable the server system 104 to communicate on the communications network 112. The web browser module 253 allows for browsing the Internet. The web server application 254 serves a plurality of web pages to client systems that request the webpages, thereby facilitating browsing on the Internet. The non-transitory storage media for managing mobile apps 255 may include the mobile apps for managing mobile apps 300, which resides on the non-transitory storage media for managing mobile apps 255 and is downloaded to a handheld wireless device 122 over the communications network 112.

The processor system 260 may include any one of, some of, any combination of, or all of multiple parallel processors, a single processor, a system of processors having one or more central processors and/or one or more specialized processors dedicated to specific tasks. The processor system 260 may implement the machine instructions stored in the memory system 250.

In an alternative embodiment, the communication interface 270 may allow the server system 104 to interface with the network 112. In this embodiment, the output system 230 sends communications to the communication interface 270. The communications system 275 may communicatively button the output system 230, the input system 240, the memory system 250, the processor system 260 and/or the input/output system 280 to each other. The communications system 275 may include any one of, some of, any combination of, or all of one or more electrical cables, one or more fiber optic cables, and/or sending one or more signals through air or water (i.e., wireless communications), or the like. Some examples of sending one or more signals through air and/or water include systems for transmitting electromagnetic waves such as infrared and/or radio waves and/or systems for sending sound waves.

The input/output system 280 may include devices that have the dual function as the input and output devices. For example, the input/output system 280 may include one or more touch sensitive screens, which display an image and therefore are an output device and accept input when the screens are pressed by a finger or a stylus, for example. The touch sensitive screens may be sensitive to heat and/or pressure. One or more of the input/output devices may be sensitive to a voltage or a current produced by a stylus, for example. The input/output system 280 is optional and may be used in addition to or in place of the output system 230 and/or the input device 240.

Figure 5:
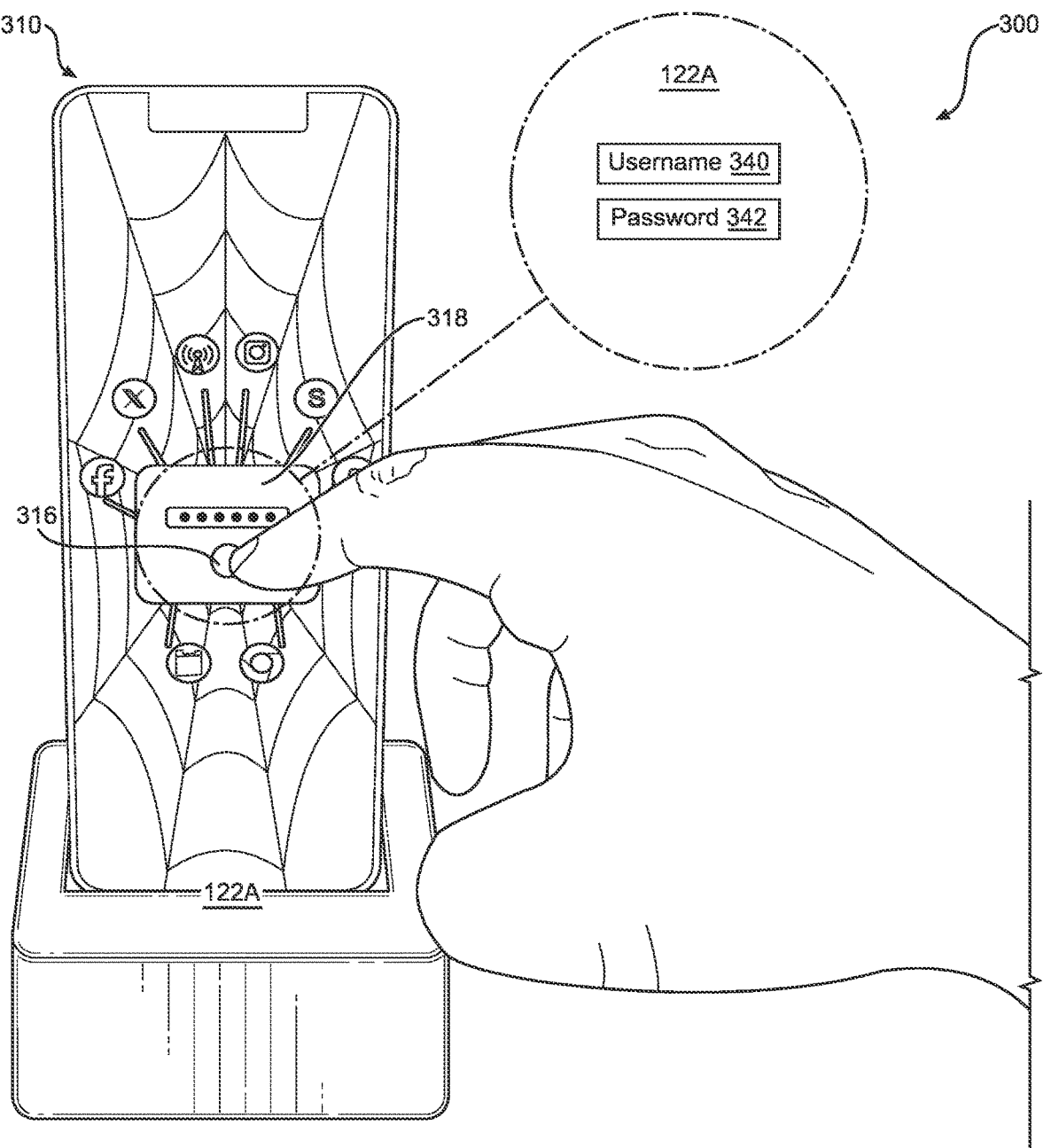
FIG. 5 shows a perspective view of a third screenshot of an embodiment of the method for managing mobile apps.
Figure 6:
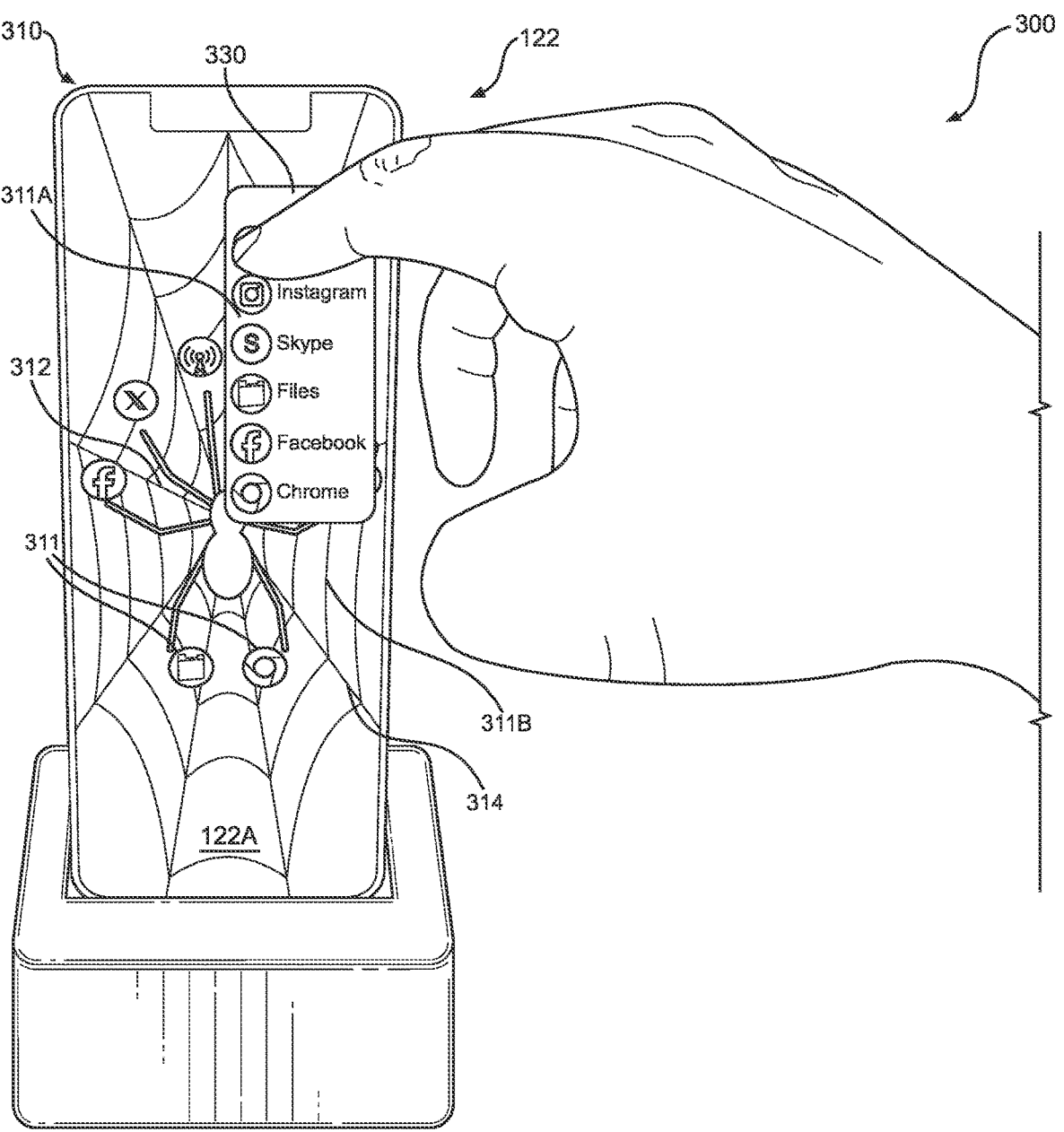
FIG. 6 shows a perspective view of a fourth screenshot of an embodiment of the method for managing mobile apps.

Referring now to FIGS. 5 and 6, there is shown a perspective view of an embodiment of the mobile apps for managing mobile apps 300.

The mobile apps for managing mobile apps 300 may include an indicia 310, a plurality of mobile app icons 320, and a list 330.

The indicia 310 may be displayed on a user interface 122A of the handheld wireless device 122 and reside on the mobile apps for managing mobile apps 300. The indicia 310 may be a spider 312 in a spider web 314 or the like. The spider 312 may have a plurality of legs 311 or the like. Each of the legs 311 may have a distal end that a mobile app 311A or a website 311B may be disposed on the distal end of each of the legs 311 or the like. The indicia 310 may be activated for authentication by a biometric thumbprint pad 316 or a fingerprint recognition security feature or TOUCH ID® that may allow a user to log-into the mobile apps for managing mobile apps 300. A progress bar 318 may display after the biometric thumbprint pad 316 is activated for authentication. The mobile apps for managing mobile apps 300 may include a single user name 340 and a single password 342 that allows access to each of the user's most popular secondary mobile apps as determined by data collected from the computer device. More specifically, the single user name 340 and the single password 342 may sign-in a respective person's up to 8 specifically chosen mobile apps to save them time, give live results, and enhance their phone storage.

The mobile app icons 320 may be displayed on a user interface 122A of the handheld wireless device 122 and reside on the mobile apps for managing mobile apps 300. More specifically, the mobile app icons 320 may be disposed on the distal end of each of the legs 311 of the spider 312 or the like. The mobile app icons 320 illustrated in FIG. 5 include an icon for promoting the goods and services of others over the Internet or a FACEBOOK® icon 321, an icon for software and software applications to enable transmission, access, organization, and management of text messaging, instant messaging, online blog journals, text, weblinks, and images via the Internet and other communications networks or a TWITTER® Icon 322, an icon for downloadable computer software and recorded computer software for use in providing retail, shopping, and ordering services or an AMAZON® icon 323, an icon for downloadable computer software for modifying the appearance and enabling transmission of images, audio-visual and video or an INSTAGRAM® icon 324, an icon for computer software for use in organizing, transmitting, manipulating, and reviewing text, data, and audio files on portable and handheld digital electronic devices or a SKYPE® icon 325, an icon for computer services, namely, search engine services; computer services, namely, acting as an application service provider or a GOOGLE® icon 326, an icon for computer operating software, computer browsing software, namely, software for browsing the global computer network and private networks or a CHROME® browser icon 327, a Messenger icon 328, or the like.

The list 330 may be displayed on the user interface 122A of the handheld wireless device 122 and reside on the mobile apps for managing mobile apps 300. The list 330 may include the mobile app icons 320 that may be disposed on the distal end of each of the legs 311 of the spider 312 from the indicia 310.

Figure 3:
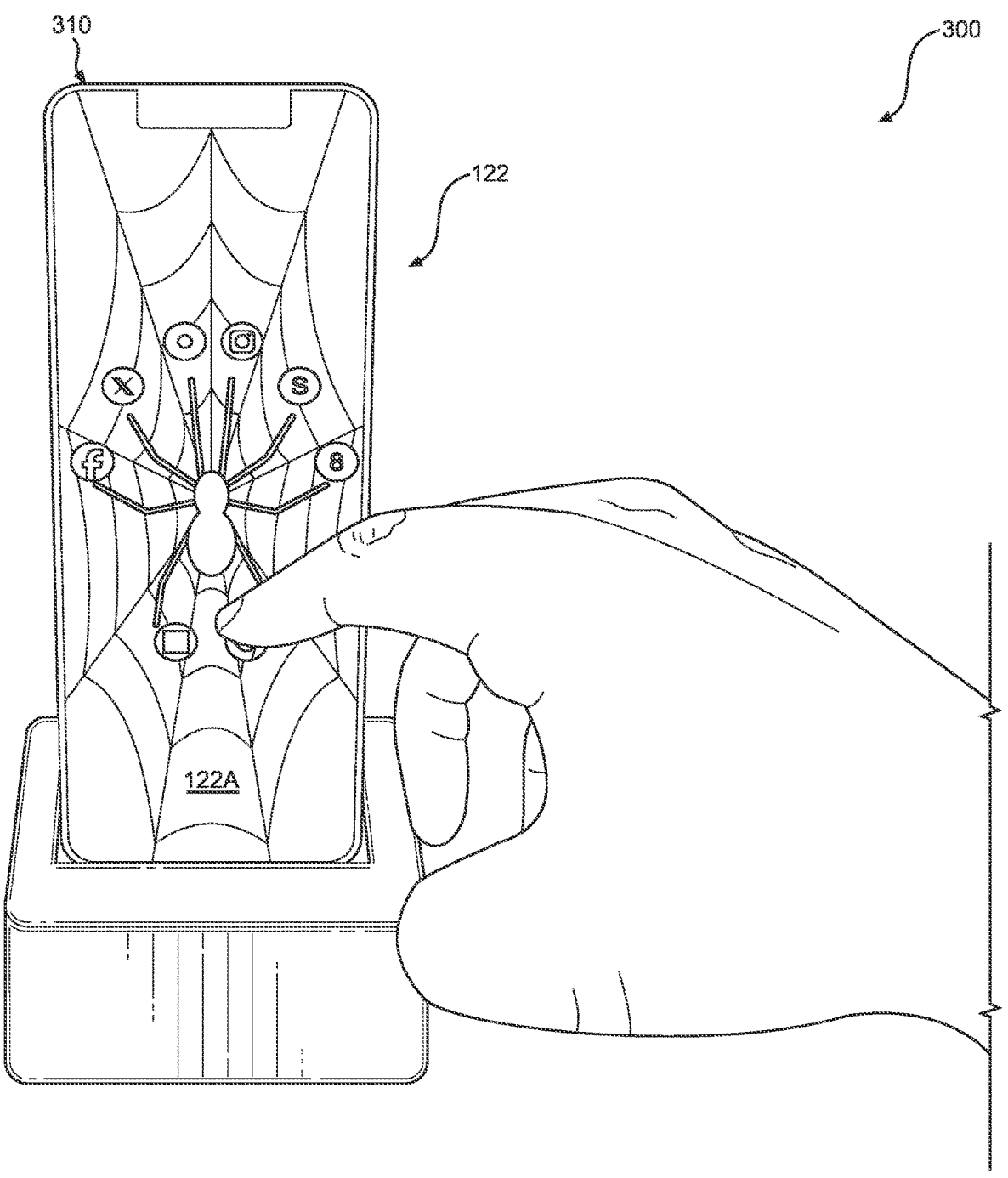
FIG. 3 shows a perspective view of a first screenshot of an embodiment of a method for managing mobile apps.
Figure 4:
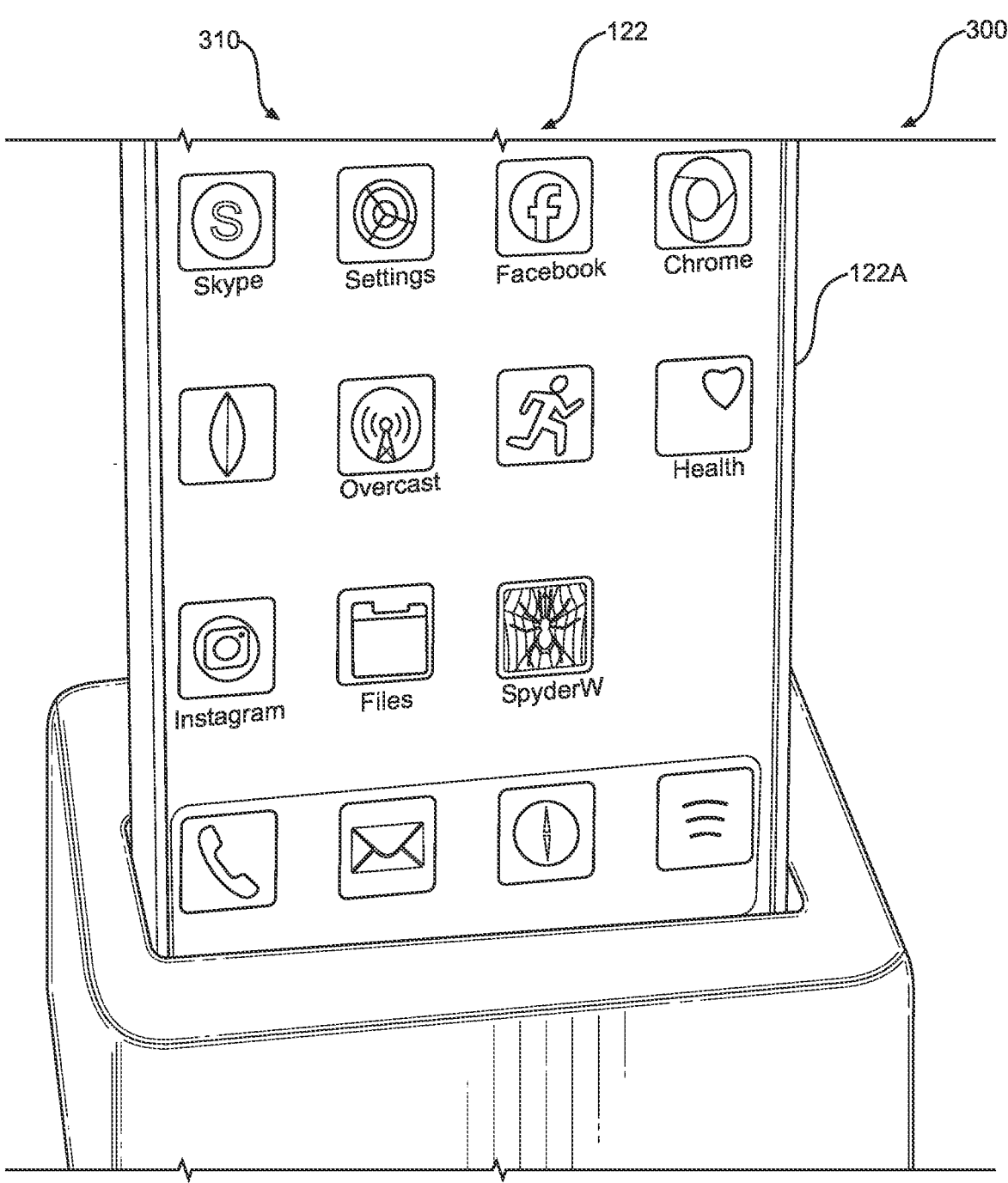
FIG. 4 shows a close-up view of a second screenshot of an embodiment of the method for managing mobile apps.
Figure 7:
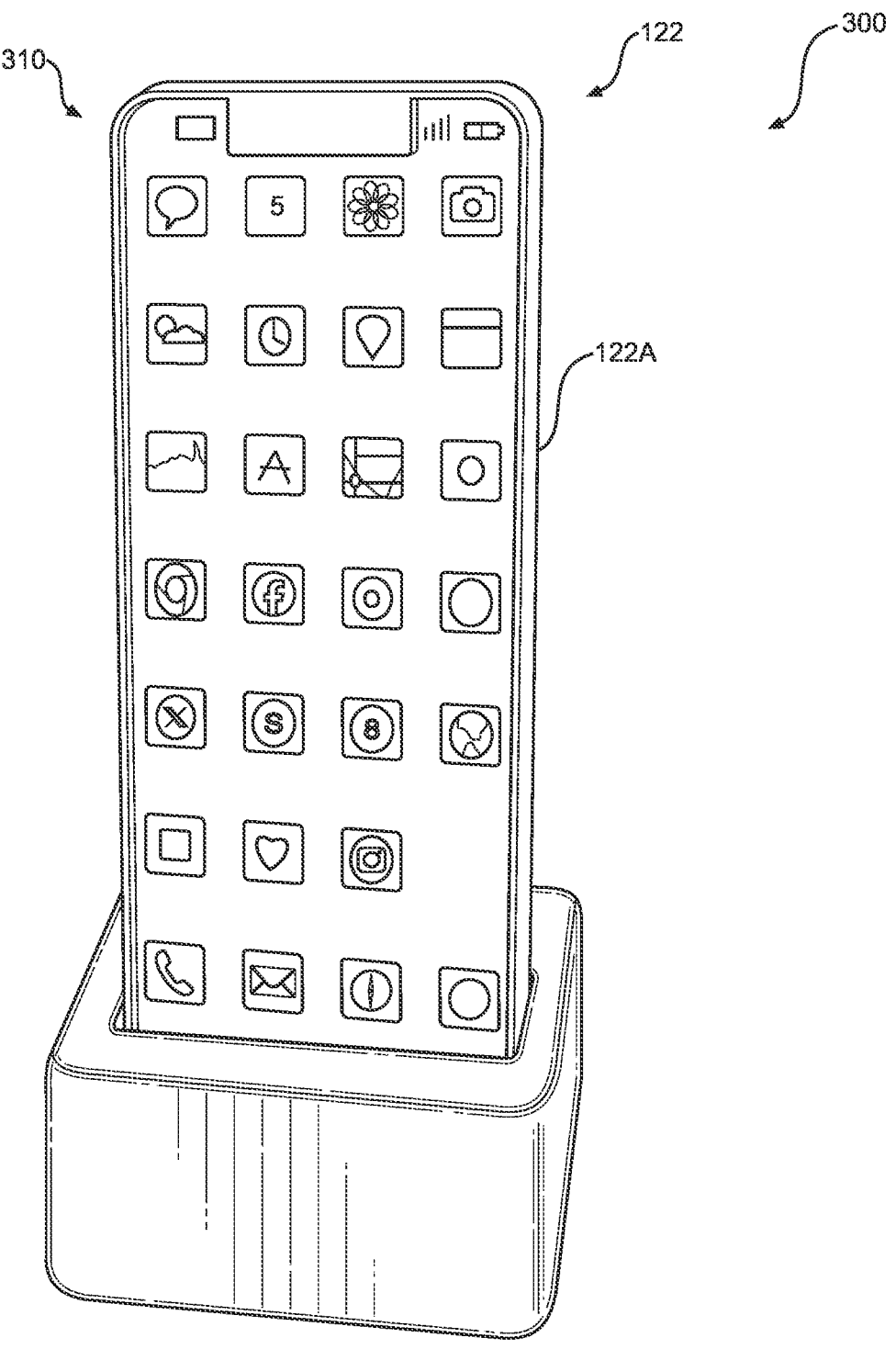
FIG. 7 shows a perspective view of a fifth screenshot of an embodiment of the method for managing mobile apps having an indicia displayed on a smartphone.

Referring now to FIGS. 3, 4, and 7, there is shown a perspective view of an embodiment of the mobile apps for managing mobile apps 300, in use to provide a close-up view of an embodiment of the indicia 310 of a spider 312 in a spider web 314.

The spider 312 may have a plurality of legs 311 and each of the legs 311 may have a distal end that a secondary mobile app 311A or a secondary website 311B may be disposed on the distal end of each of the legs 311, and a perspective view of an embodiment of the indicia 310 of a spider 312 in a spider web 314 displayed on the user interface 122A of the handheld wireless device 122, respectively.

In use, the mobile apps for managing mobile apps 300 may be configured to manage up to approximately 8 frequently used secondary applications and websites, allowing users to switch from one mobile app or website to the next without any hassle. However, in alternative embodiments, any suitable number of secondary mobile apps or websites may be managed by the mobile apps for managing mobile apps 300.

FIG. 8 shows a flowchart of a method for managing mobile apps 400.

The overall method 400 may include the steps of downloading the mobile app for managing mobile apps onto a computing device 410, entering a secure password to access a mobile app for managing mobile apps 420, selecting one or more secondary mobile apps residing on a computer device from a list generated by the mobile app for managing mobile apps 430, allowing the mobile app for managing mobile apps to simultaneously log a user into each of a plurality of secondary mobile apps upon successful user authentication 440, displaying a selection of a user's most popular secondary mobile apps as determined by data collected from the computer device 450, and inputting a plurality of individual login information for each of the secondary mobile apps 460.

The downloading step 410 may include the mobile app for managing mobile apps is downloaded from a company website or is downloaded and purchased through a digital distribution platform. The entering step 420 may include the secure password includes a biometric thumbprint pad or a fingerprint recognition security feature or TOUCH ID®. The selecting step 430 may include the computer device is selected from the group consisting of a mobile phone, a laptop computer, a tablet computer, or a personal computer. The allowing step 440 may include the successful user authentication is a biometric thumbprint pad or a fingerprint recognition security feature or TOUCH ID®. The displaying step 450 may include the selection of a user's most popular secondary mobile apps are populated in the list by the mobile apps for managing mobile apps. The inputting step 460 may include the individual login information for each of the secondary mobile apps and provided it to the mobile apps for managing mobile apps to log-in and access each of the secondary mobile apps.

In some embodiments, a plurality of advertisement space may reside on the non-transitory storage media for managing mobile apps. The advertisement space may generate revenue when the non-transitory storage media for managing mobile apps is in use.

In some embodiments, further comprising a user interacts with the non-transitory storage media for managing mobile apps via an input method selected from the group consisting of a plurality of touch controls, a plurality of keyboard input, or a plurality of voice commands.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method for managing mobile apps, comprising the steps of:

downloading a mobile app for managing mobile apps onto a computing device;

entering a secure password to access the mobile app for managing mobile apps;

selecting one or more secondary mobile apps residing on the computing device from a list generated by the mobile app for managing mobile apps;

allowing the mobile app for managing mobile apps to simultaneously log a user into each of a plurality of secondary mobile apps upon successful user authentication;

displaying a selection of a plurality of the user's most popular secondary mobile apps as determined by data collected from the computing device; and inputting a plurality of individual login information for each of the secondary mobile apps.

2. The method for managing mobile apps, according to claim 1, wherein the downloading step includes the mobile app for managing mobile apps is downloaded from a company website.

3. The method for managing mobile apps, according to claim 1, wherein the downloading step includes the mobile app for managing mobile apps is downloaded and purchased through a digital distribution platform.

4. The method for managing mobile apps, according to claim 1, wherein the entering step includes the secure password having a user name and a password to access the mobile app for managing mobile apps.

5. The method for managing mobile apps, according to claim 1, wherein the selecting step includes the computing device is selected from the group consisting of a mobile phone, a laptop computer, a tablet computer, or a personal computer.

6. The method for managing mobile apps, according to claim 1, wherein the allowing step includes the successful user authentication is a fingerprint recognition security feature.

7. The method for managing mobile apps, according to claim 1, wherein the displaying step includes the user's most popular secondary mobile apps are populated in the list by the mobile app for managing mobile apps.

8. The method for managing mobile apps, according to claim 1, wherein the inputting step includes the individual login information for each of the secondary mobile apps and provided it to the mobile app for managing mobile apps to log-in and access each of the secondary apps.

9. The method for managing mobile apps, according to claim 1, further comprising a plurality of advertisement space resides on the non-transitory storage media for managing mobile apps to generate revenue when the non-transitory storage media for managing mobile apps is in use.

10. The method for managing mobile apps, according to claim 1, further comprising the user interacts with the non-transitory storage media for managing mobile apps via an input method selected from the group consisting of a plurality of touch controls, a plurality of keyboard input, or a plurality of voice commands.

11. A non-transitory computer storage media having instructions stored thereon which, when executed, execute a method comprising the steps of:

downloading a mobile app for managing mobile apps onto a computing device;

entering a secure password to access the mobile app for managing mobile apps;

selecting one or more secondary mobile apps residing on the computing device from a list generated by the mobile app for managing mobile apps;

allowing the mobile app for managing mobile apps to simultaneously log a user into each of a plurality of secondary mobile apps upon successful user authentication;

displaying a selection of a plurality of the user's most popular secondary apps as determined by data collected from the computer computing device; and inputting a plurality of individual login information for each of the secondary apps.

12. The non-transitory computer storage media, according to claim 11, wherein the downloading step includes the mobile app for managing mobile apps is downloaded from a company website.

13. The non-transitory computer storage media, according to claim 11, wherein the downloading step includes the mobile app for managing mobile apps is downloaded and purchased through a digital distribution platform.

14. The non-transitory computer storage media, according to claim 11, wherein the entering step includes the secure password having a user name and a password to access the mobile app for managing mobile apps.

15. The non-transitory computer storage media, according to claim 11, wherein the selecting step includes the computing device is selected from the group consisting of a mobile phone, a laptop computer, a tablet computer, or a personal computer.

16. The non-transitory computer storage media, according to claim 11, wherein the allowing step includes the successful user authentication is a fingerprint recognition security feature.

17. The non-transitory computer storage media, according to claim 11, wherein the displaying step includes the user's most popular secondary apps are populated in the list by the mobile app for managing mobile apps.

18. The non-transitory computer storage media, according to claim 11, wherein the inputting step includes the individual login information for each of the secondary apps and provided it to the mobile app for managing mobile apps to log-in and access each of the secondary apps.

19. The non-transitory computer storage media, according to claim 11, further comprising a plurality of advertisement space resides on the non-transitory storage media for managing mobile apps to generate revenue when the non-transitory storage media for managing mobile apps is in use.

20. The non-transitory computer storage media, according to claim 11, further comprising the user interacts with the non-transitory storage media for managing mobile apps via an input method selected from the group consisting of a plurality of touch controls, a plurality of keyboard input, or a plurality of voice commands.

* * * * *